No. 12,270. REISSUED SEPT. 27, 1904.
G. RISCHMULLER.
DOOR OPENER.
APPLICATION FILED AUG. 13, 1902.
2 SHEETS—SHEET 1.
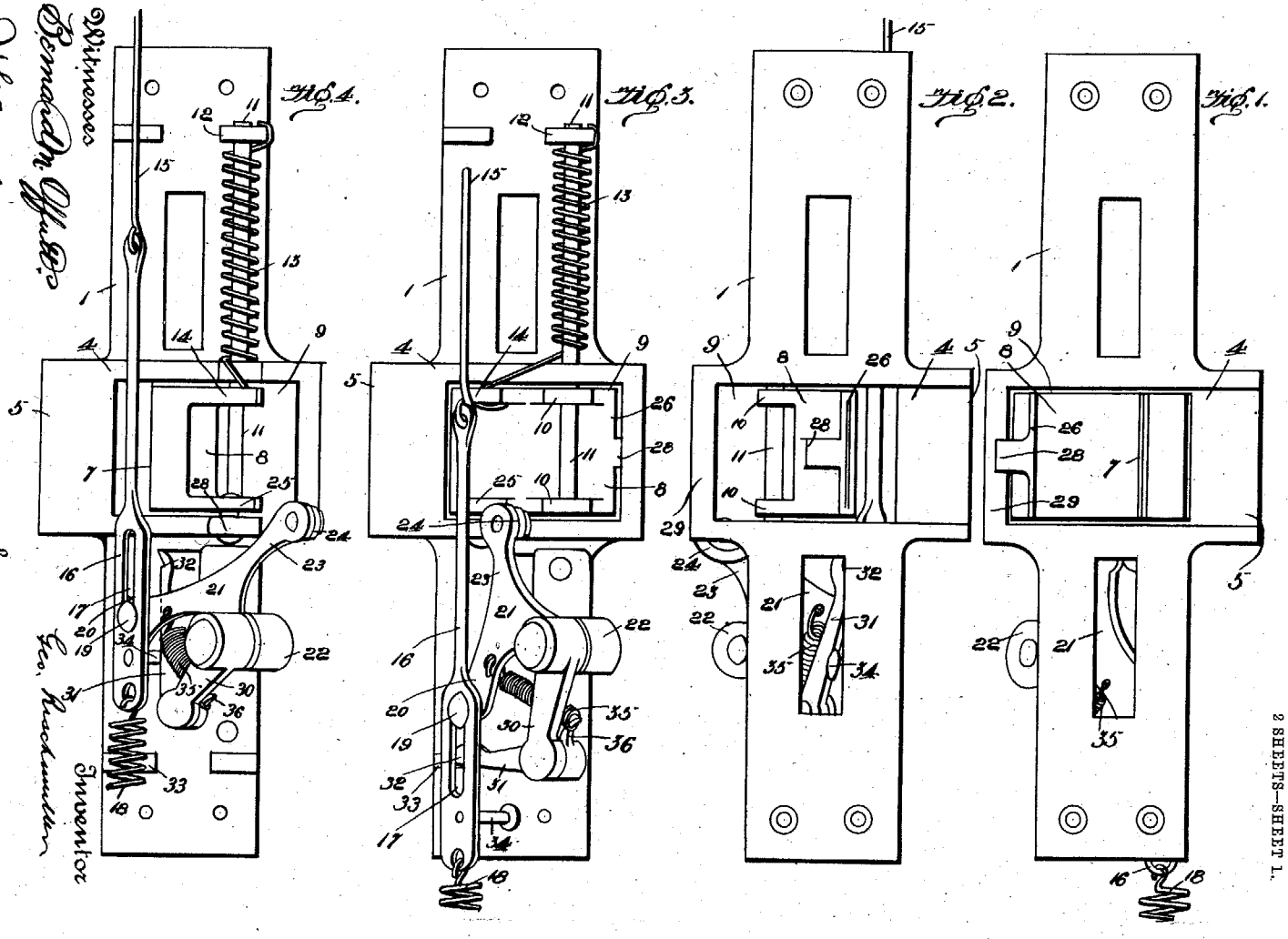
Witnesses
Bernard M. Offutt.
W. G. Crowley.
Inventor
Geo. Rischmuller
by Francis M. Wright,
Attorney No. 12,270. REISSUED SEPT. 27, 1904.
G. RISCHMULLER.
DOOR OPENER.
APPLICATION FILED AUG. 13, 1902.
2 SHEETS—SHEET 2.
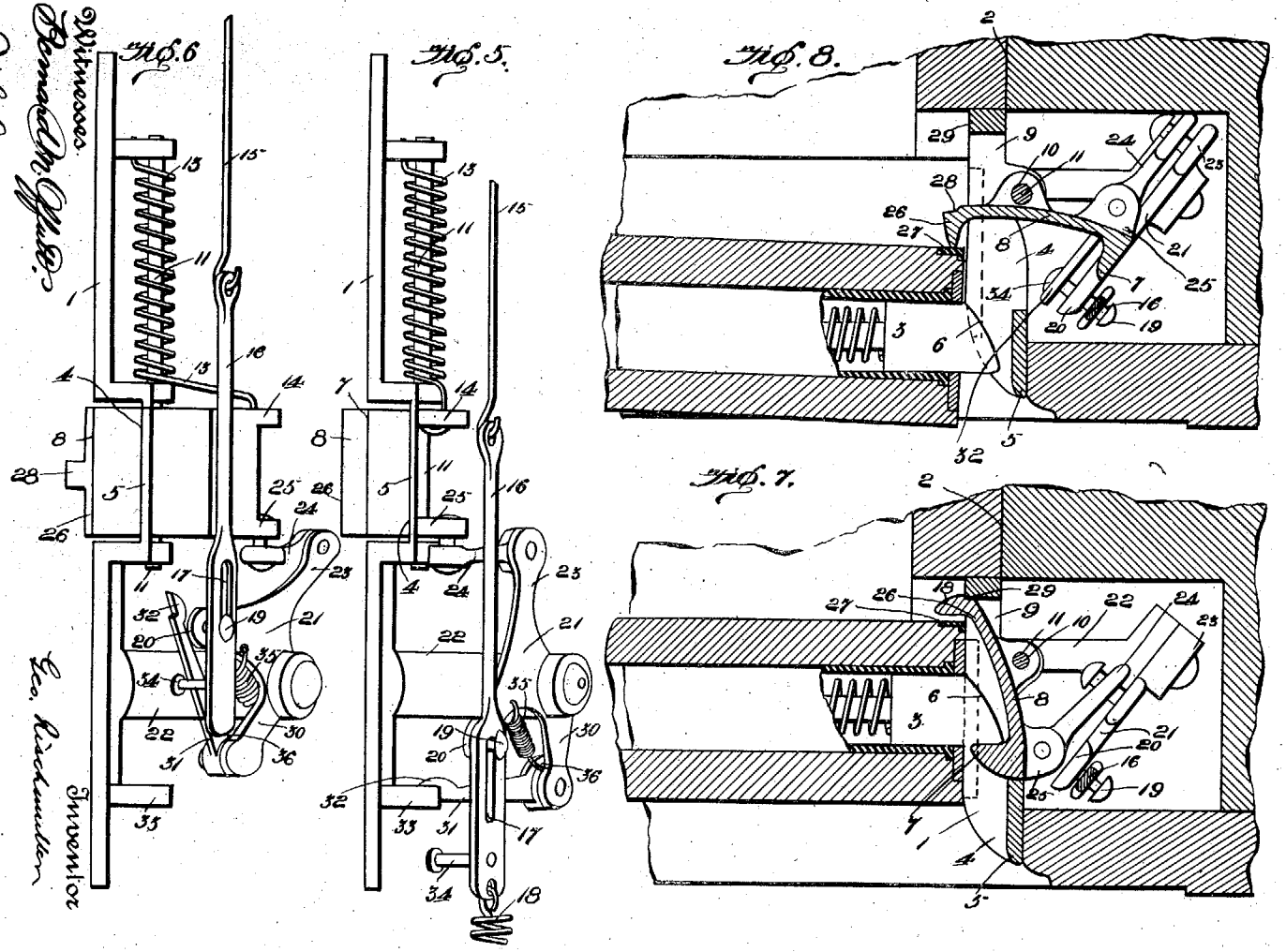
Witnesses.
Bernard M. Offutt.
W. G. Crowley.
Inventor
Geo. Rischmuller
by Francis M. Wright.
Attorney No. 12,270. Reissued September 27, 1904.

UNITED STATES PATENT OFFICE.

GEORGE RISCHMULLER, OF SAN FRANCISCO, CALIFORNIA.

DOOR-OPENER.

SPECIFICATION forming part of Reissued Letters Patent No. 12,270, dated September 27, 1904.

Original No. 705,147, dated July 22, 1902. Application for reissue filed August 13, 1902. Serial No. 119,547.

*To all whom it may concern:*

Be it known that I, GEORGE RISCHMULLER, a citizen of the United States, residing at San Francisco, in the county of San Francisco and State of California, have invented certain new and useful Improvements in Door-Openers, of which the following is a specification.

My invention relates to an improved device for unlatching and opening doors from a distant point. It is especially adapted for use in buildings containing flats, where the street-door is to be opened from an upper flat without descending to the door for that purpose.

The object of my invention is to provide a door-opener which can be used in conjunction with the door-check of the ordinary form, and for this purpose I have devised a door unlatching and opening device in which the pressure is applied at the free edge of the door.

My invention therefore resides in the novel construction, combination, and arrangement of parts hereinafter fully specified, and particularly pointed out in the claims.

In the accompanying drawings, Figure 1 is a front elevation of a striking-plate and the parts connected therewith constituting my invention, the parts being in the position they occupy before opening the door. Fig. 2 is a similar view showing the parts in the position they occupy after opening the door. Fig. 3 is a rear view corresponding to Fig. 1. Fig. 4 is a rear view corresponding to Fig. 2. Fig. 5 is a side view corresponding to Fig. 1. Fig. 6 is a side view corresponding to Fig. 2. Fig. 7 is a horizontal section through the door-latch and the striking-plate, the parts being in the position corresponding to Fig. 1. Fig. 8 is a similar view, the parts being in the position corresponding to Fig. 2.

Referring to the drawings, 1 represents a striking-plate inserted in the face of the door-jamb 2 in the usual manner. Said striking-plate has its central portion opposite to the door-latch 3 increased in width and has a transverse recess or depression 4 extending almost the full width of said central portion. The bottom of said recess at the inner side of the striking-plate forms a ledge 5, against which the beveled face 6 of the latch rides when the door is being closed. Said latch then passes over a lip 7, formed upon the outer end of a dog or lever 8, pivoted to swing through an opening 9, formed in the recessed portion of the socket-plate. Said dog has ears 10, by means of which and a pivot-pin 11 it is pivoted to the striking-plate, said pin then extending upwardly and passing through a lug 12, cast upon the upper end of the striking-plate to form a support for a coiled spring 13, which is attached to a lug 14 on the dog to throw the same normally forward or inward. Thus as soon as the latch has passed the lip 7 of said dog said lip is thrown inward behind said latch and prevents the opening of the door.

The door is opened from a distant point by means of a wire 15, suitably guided to the distant point and attached to the upper end of a link 16, the lower end of which is slotted, as shown at 17. A spring 18, attached to the lower end of the link 16, retracts the wire when the tension is released. In the slot 17 moves a stud 19, carried on an arm 20 of a lever 21, pivoted on a standard erected on the striking-plate, to another arm, 23, of which lever is attached a link 24, said link 24 being also connected with a lug 25, projecting rearwardly from the dog. Thus when the lower end of the slot reaches the stud 19 the latter begins to move upwardly, thereby swinging rearwardly the arm 23 of the lever and also swinging rearwardly or outwardly the dog and withdrawing the lip 7 from behind the rear or inner face of the latch 3, permitting the latch to move inwardly and the door to be opened. At the same time a positive outward movement is given to the door by means of an arm or finger 26 of said dog, which extends behind the outer edge of the door, which arm when the dog is swung outwardly abuts against a small plate 27, secured on said outer edge to avoid wear, and so positively opens the door a short distance. This will apprise the person seeking admittance that the door is now unlatched, and he will now need only to push the door fully open in order to enter. The arm 26 has a short lug or stop 28, which rests against the edge 29 of the striking-plate and limits the backward movement of the dog. A strong push against the door from the outside might have the effect of swinging the door inward by the mere pressure of the latch upon the lip 7 of the dog. I therefore provide positive locking means to prevent this. It is clear that the dog 8 cannot be swung outward unless the arm 20 of the lever moves upward. This is prevented by providing a third arm 30 of said lever, which moves inward when the arm 20 moves upward, and this inward movement is prevented by means of a locking-arm 31, pivotally attached to the arm 30 and having a notched free end, as shown at 32, which notched end normally rests upon a lug 33, extending outward from the striking-plate. When the arm rests with its notched end upon said lug, inward movement of the arm 30 and upward movement of the arm 20 will be prevented; but in the operation of opening the door the first effect of raising the link 16 by means of the wire 15 will be to cause a stud 34 to strike against the under side of the locking-arm 31 and raise the same from engagement with the lug 33. This will permit the lever 21 to swing and the dog 8 also to swing outwardly, thus opening the door. The locking-arm 31 will when the parts are at the position shown in the drawings fall into its place by gravity when released. In order to prevent said locking-arm from swinging too far over, a spring 35 is provided, attached to the arm 21 and also to a short arm 36 at right angles to the locking-arm. This spring has the further advantage of positively insuring the dropping of the locking-arm into place, which operation might possibly fail to take place in the case of a tight joint or dust or dirt impeding the movement of said arm.

I claim—

1. In combination with a spring-actuated latch having a beveled face, a door-opener comprising a lip arranged to engage said latch to prevent the door opening, said beveled face and latch engaging each other when the door is closed to move the latch inward past the lip, an arm arranged to engage the free edge of the door to swing the same on its hinges, and means for transmitting to said lip and arm force applied at a distant point to withdraw the lip out of engagement with the latch and to move the arm to swing the door open, substantially as described.

2. In combination with a spring-actuated latch having a beveled face, a door-opener comprising a lip arranged to engage said latch to prevent the door opening, said beveled face engaging the lip when the door is closed to move said latch inward past the lip, an arm arranged to engage said door to swing the same on its hinges, and means for transmitting to said lip and arm force applied at a distant point to withdraw the lip out of engagement with the latch and to move the arm to swing the door open, substantially as described.

3. In a door-opener, the combination with a striking-plate of a device movably supported thereon comprising a lip arranged to engage the latch of the door and prevent inward movement thereof, and an arm arranged to engage said door to swing the same on its hinges, and means for transmitting to said device from a distant point force applied at said distant point to withdraw the lip out of engagement with the latch and to press the arm against the door to swing the same open, the path of transmission of said force from said distant point to said arm being continuous so that the force applied to the arm is proportioned to the force applied at the distant point, substantially as described.

4. In a door-opener, the combination with a striking-plate of a device movably attached thereto, comprising a lip adapted to engage the latch of the door and prevent inward movement thereof, and an arm arranged to engage the outer free edge of the door, and means for transmitting to said device from a distant point force applied at said distant point to withdraw the lip out of engagement with the latch and to press the arm against the outer edge of the door to push the same open, the path of transmission of said force from said distant point to said arm being continuous so that the force applied to the arm is proportioned to the force applied at the distant point, substantially as described.

5. In a door-opener, the combination with the striking-plate of a door, of a dog pivotally mounted on said striking-plate, said dog having a lip arranged to engage the latch of the door when the door is closed, to prevent inward movement of the same, and having also an arm arranged to engage the outer free edge of the door, means for swinging said dog to remove said lip from engagement with the latch to release the latter and to press the arm against the outer free edge of the door to push the same open, and means for imparting to said swinging means from a distant point force applied at said distant point, the path of transmission of said force from said distant point to said arm being continuous so that the force applied to the arm is proportioned to the force applied at the distant point, substantially as described.

6. In a door-opener, the combination with the striking-plate of a door, of a dog having a lip arranged to engage the latch of the door, when the latter is closed, to prevent the opening of the door, a lever whereof an arm is attached to said dog to draw said lip away from said latch, and a wire extending to a distant point and suitably connected with said lever to actuate the dog to release said door, substantially as described.

7. In a door-opener, the combination with a striking-plate of a door, of a dog pivotally mounted thereon having a lip arranged to engage the latch of the door to prevent the opening of the door, and having also a device arranged to engage the door to thrust the same open when said dog is vibrated, a spring for normally throwing said dog inward toward said latch, a lever having an arm connected with said dog to swing the same upward, a locking-arm connected with another arm of said lever, said locking-arm engaging a suitable stop to prevent the outward swinging of said dog, and a link having a sliding connection with an arm of said lever and arranged first to operate said locking-arm to release the same and then to actuate said lever to swing said dog outwardly, substantially as described.

8. In a door-opener, the combination with a striking-plate of a door, of a dog pivoted thereon having a lip arranged to engage the latch of the door to prevent the opening of the door and having also a part arranged to engage said door to push the same open when the dog is moved, a lever, a link connecting one arm of said lever with said dog to swing the same, a locking-arm pivotally mounted upon another arm of said lever, a stop against which said locking-arm abuts to prevent the moving of said lever to swing the dog outwardly, and a vertically-moving link having a stud arranged to engage said locking-arm to withdraw the same and having also a slot to engage a stud on another arm of said lever, whereby, after a certain movement upward of said link, said link actuates said lever to release said dog from engagement with said latch, substantially as described.

9. In a device of the class described, in combination with a striking-plate for the door, a finger adapted to engage said door, a lever adapted to engage the latch of the door, and means for operating said lever and finger whereby said latch is released and said door is forced open, substantially as described.

In witness whereof I have hereunto set my hand this 22d day of July, 1902.

GEORGE RISCHMULLER.

Witnesses:
BESSIE GORFINKEL,
FRANCES M. WRIGHT.